(12) United States Patent
Cho et al.

(10) Patent No.: US 12,130,852 B1
(45) Date of Patent: Oct. 29, 2024

(54) MULTI-STAGE NARRATIVE ANALYSIS

(71) Applicant: Two Six Labs, LLC, Arlington, VA (US)

(72) Inventors: Simon Cho, Arlington, VA (US); Chae A. Clark, Arlington, VA (US); Reed Gordon-Sarney, Arlington, VA (US); James Gentile, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 63 days.

(21) Appl. No.: 17/748,318

(22) Filed: May 19, 2022

(51) Int. Cl.
*G06F 16/30* (2019.01)
*G06F 16/35* (2019.01)

(52) U.S. Cl.
CPC .................... *G06F 16/35* (2019.01)

(58) Field of Classification Search
CPC ...................................... G06F 16/35
See application file for complete search history.

(56) References Cited

U.S. PATENT DOCUMENTS

2006/0149720 A1* 7/2006 Dehlinger ............. G06F 16/313
707/E17.084
2023/0274094 A1* 8/2023 Tunstall-Pedoe ....... G06F 40/30
704/9

OTHER PUBLICATIONS

Article entitled "What is this article about? Generative summarization with the BERT model in the geosciences domain", by Ma et al., dated Sep. 22, 2021 (Year: 2021).*
Article entitled "SciSummPip: An Unsupervised Scientific Paper Summarization Pipeline", by Ju et al., dated Oct. 19, 2020 (Year: 2020).*
Article entitled "COVIDSum: A linguistically enriched SciBERT-based summarization model for COVID-19 scientific papers" by Cai et al., dated Mar. 2022 (Year: 2022).*
Article entitled "A Summarization System for Scientific Documents", by Erera et al., dated Aug. 29, 2019 (Year: 2019).*
Article entitled "Clinical Context-Aware Biomedical Text Summarization Using Deep Neural Network: Model Development and Validation", by Afzal et al., dated Oct. 2020 (Year: 2020).*

* cited by examiner

*Primary Examiner* — Mahesh H Dwivedi
(74) *Attorney, Agent, or Firm* — Armis IP Law, LLC

(57) ABSTRACT

An extractive summarization model provides extraction and classification of research assertions, or claims, made by a documented body of research such as a scientific paper or article. Modern electronic publication and dissemination allows tremendous capability for researching and scrutinizing previous documented efforts for further research and study. Accordingly, a substantial volume of material is easily obtained in response to research efforts. The extractive summarization model provides a summarization of this scientific literature by identifying and classifying asserted claims made by a particular research document. Researchers may quickly identify relevant documents based on the extracted claims asserted by the document, facilitating substantive review.

17 Claims, 7 Drawing Sheets

MULTI-STAGE NARRATIVE ANALYSIS

STATEMENT REGARDING FEDERALLY SPONSORED RESEARCH AND DEVELOPMENT

This invention was made, at least in part, with government support under Contract No. W911NF-20-C-0002. The Government has certain rights in the invention.

BACKGROUND

Research papers serve to document the scholarly efforts of academic and professional endeavors. Publication serves as a medium to evidence achievement and results of research efforts. Many disciplines have established periodicals that respond to requests for publications, and disseminate the research papers to members of the relevant scientific community. These communities are often rather specific to individual areas of research, and instill a collaborative environments as scholars and scientists consider and rely on documented efforts of their peers in furthering research within the scientific community.

SUMMARY

An extractive summarization model provides extraction and classification of research assertions, or claims, made by a documented body of research such as a scientific paper or article. Modern electronic publication and dissemination allows tremendous capability for researching and scrutinizing previous documented efforts for further research and study. Accordingly, a substantial volume of material is easily obtained in response to research efforts. The extractive summarization model provides a summarization of this scientific literature by identifying and classifying asserted claims made by a particular research document. Researchers may quickly identify relevant documents based on the extracted claims asserted by the document, facilitating substantive review.

Extractive summarization of scientific documents is a specific variant of the more general natural language processing task of document summarization, made more significant by the ever-increasing availability of scientific literature. It is a task that presents its own specific challenges, such as (1) a lower availability of labeled data and (2) a more richly structured discourse capturing each facet of scientific content differently. A method based on text similarity to refine and augment datasets with imperfect or incomplete annotations maximizes the value of available data. A meta-architecture utilizing two classifiers in series for the task of extracting summary text segments and then labeling them with a discourse type, outperforms the straightforward single classifier approach to this task.

Configurations herein are based, in part, on the observation that a research task in a scientific effort generates a substantial volume of material, due to rapid and widespread availability of publications disseminated via Internet channels. Unfortunately, conventional approaches to traversal and consideration of the candidate materials suffer from the shortcoming that formidable review time may be required to selectively consider the most relevant documents from among the many gleaned from search efforts. Accordingly, configurations herein substantially overcome the shortcomings of conventional approaches by providing a machine learning model and training approach for serial classification using a multi-stage approach for extractive summarization of a plurality of documents to present classifications of claim assertions made by the respective documents. Selection of the most relevant works from the claim assertions, rather than the full body and prose of the documents, provides a selective, targeted review in a manageable timeframe.

In further detail, a multi-stage classifier determines and extracts claim assertions of a scientific effort by computing, from a narrative representation of a scientific effort, a first group of sentences based on a first model of a first set of annotated features derived from an annotated corpus of statements. A subsequent stage computing, from the first group of sentences, a classification each of the sentences in the first group of sentences based on a second model of a second set of annotated features derived from the annotated corpus of statements. Rather than consider the entire corpus, the second model is trained on a subset of the annotated corpus, where the subset is determined based on the first set of annotated features. The resulting the classification of each sentence is therefore defined by a probability having a higher accuracy than a classification based only on a single model derived from both the first set and the second set of annotated features as a single stage.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example of the executive summarization model is described below, based on a corpus of documents containing a narrative representation of a scientific effort. The approach below is provided to illustrate a particular way the disclosed approach may operate, however other corpi and models may be employed as discussed further below. A machine learning model is implemented as a neural network using neural attention, and trained on a portion of the corpus, with the remainder of the corpus retained for testing and validation. Other types of machine learning models may also be employed, such as random forests.

Figure 1:
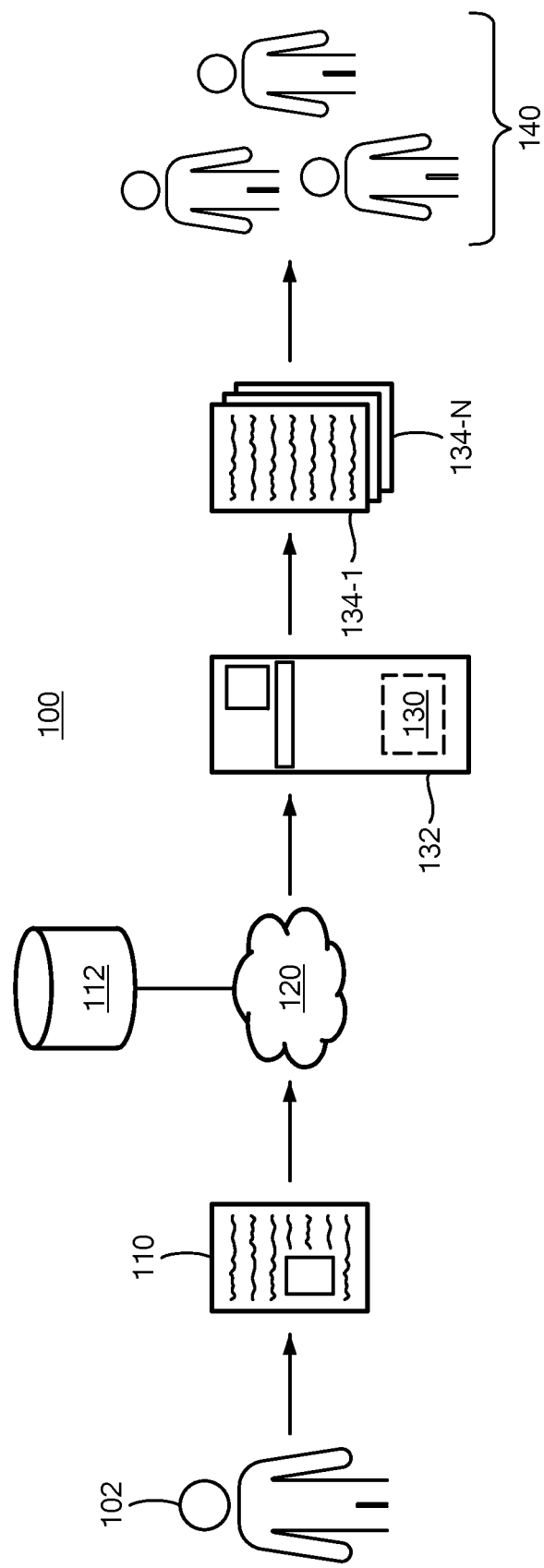
FIG. 1 is a context diagram of a scientific environment suitable for use with configurations herein.

FIG. 1 is a context diagram of a scientific environment suitable for use with configurations herein. Referring to FIG. 1, in a scientific environment 100, contributors 102 document their efforts in a narrative representation 110 such as research paper or document that may be reviewed and/or published. Typically, completed narrative representations are indexed and stored in a database 112 accessible via the Internet 120 or other public access network. Researchers, including professors and students at academic institutions, and industry workers, often in R&D (Research and Development) often search these databases for supporting new research efforts. A quick read of a robust scientific research paper will list an abundance of bibliographic notations to previous works considered by the author. A myriad of publications and professional organizations provide such databases, often related to various specialties and niche technologies within a more general industry. In sum, a typical Internet research effort is likely to yield a large number of narrative representations related to a particular inquiry.

Configurations herein perform extractive summarization of scientific documents to generate a summary of scientific assertions, or claims, put forth by a particular document. A multi-stage classifier 130 determines claim assertions of a scientific effort and renders the claims in a more manageable summary form 134-1 . . . 134-N (134 generally) for each evaluated document. The multi-stage classifier 130 executes on a server 132 or similar computing resource for classifying claims of a scientific document. The multi-stage classifier 130 operates as a software entity such as a neural network in the memory of the server, or in various cloud computing facilities, networked computing resource or multi-processor cluster. A plurality of research documents are often classified to generate a corresponding plurality of summaries 134 depicting the claim classification of the research assertions put forth by the respective narrative representation 110 of a scientific document. Other researchers 140 may then simply review the claim classification rather then the full text and prose of the respective documents for identifying relevance to a particular area of knowledge. It should be noted that the research assertions put forth by the narrative representations 110 are customarily referred to as "claims" or "claim assertions," not to be confused with the legal definition of the Claims put forth by this Patent Application.

The disclosed approach performs a task within the field of extractive summarization of scientific documents, and further provides beneficial aspects in the broader field of automatic summarization. The multi-stage classifier 130 provides an automated way to perform (1) claim detection, i.e. extraction of scientifically relevant statements (claims) from within research papers, and (2) claim classification, i.e. classification of these statements according to their claim type.

Scientific discourse is richly structured, and a complete scientific narrative encompasses this structure. Scientific arguments—which might serve as summaries of scientific documents—consist of multiple units of scientific discourse, each of which has a distinct type. That is, a complete argument or summary could consist of a hypothesis, a description of an experiment to test that hypothesis, the results of that experiment, and the conclusions drawn.

Figure 2:
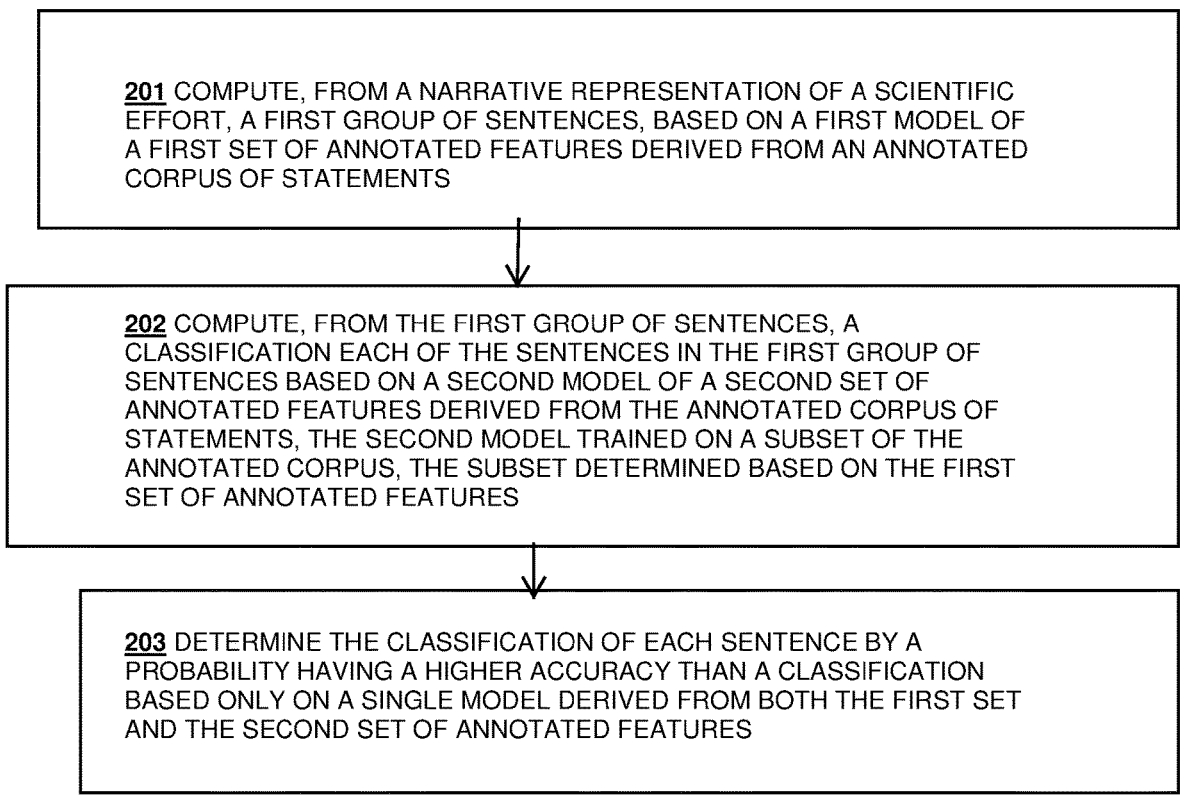
FIG. 2 is a flowchart of extractive summarization in the environment of FIG. 1.

To produce a good summary of a scientific document, it is therefore not sufficient to merely separate the relevant statements (claims) from the irrelevant (prose); we must also understand and classify the extracted claims into different claim types according to which aspect of scientific argumentation they embody. The multi-stage classifier establishes a framework to use a neural attention approach to each of the claim detection and claim classification tasks separately, and then compose these models in series. Test results show that this achieves superior performance on the overall task compared to a single model approach. FIG. 2 is a flowchart of extractive summarization in the environment of FIG. 1. Referring to FIGS. 1 and 2, a server 132 executes a multi-stage classifier 130 for determining claim assertions of a scientific efforts. Processing includes a training phase and a production phase. The training phase includes, at step 201, computing, from a narrative representation of a scientific effort, a first group of sentences, based on a first model of a first set of annotated features derived from an annotated corpus of statements. The second phase computes, from the first group of sentences, a classification of each of the sentences in the first group of sentences based on a second model of a second set of annotated features derived from the annotated corpus of statements, depicted at step 202. The second model is for classification and is trained on a subset of the annotated corpus, where the subset determined based on the first set of binary based annotated features. As a result, the classification of each sentence is therefore defined by a probability having a higher accuracy than a classification based only on a single model derived from both the first set and the second set of annotated features, as disclosed at step 203. In other words, accuracy is increased when the corpus for training the classifier (second model) is relieved of the burden of evaluating the prose, which has already been pruned by the Boolean classifier (first model).

The perspective of the multi-tiered approach is that scientific summaries should involve not only the separation of statements into claims vs. prose but also the further classification of those claims into finer types. The disclosed approach separately fine-tunes two models derived from the same corpus and then composes them in series, with a binary claim detector model passing on segments labeled as claims to a multiclass claim classifier model to be further labeled with a claim type. The disclosed configuration employs SciBERT models, however any suitable implementation could be employed. Test results indicate that this two-stage setup results in a moderate performance increase over a single-stage setup that learns the detection and classification tasks simultaneously. Here it is clear that the setup is the reason for the performance increase, since the corpus remains the same across the two setups being tested.

Figure 3:
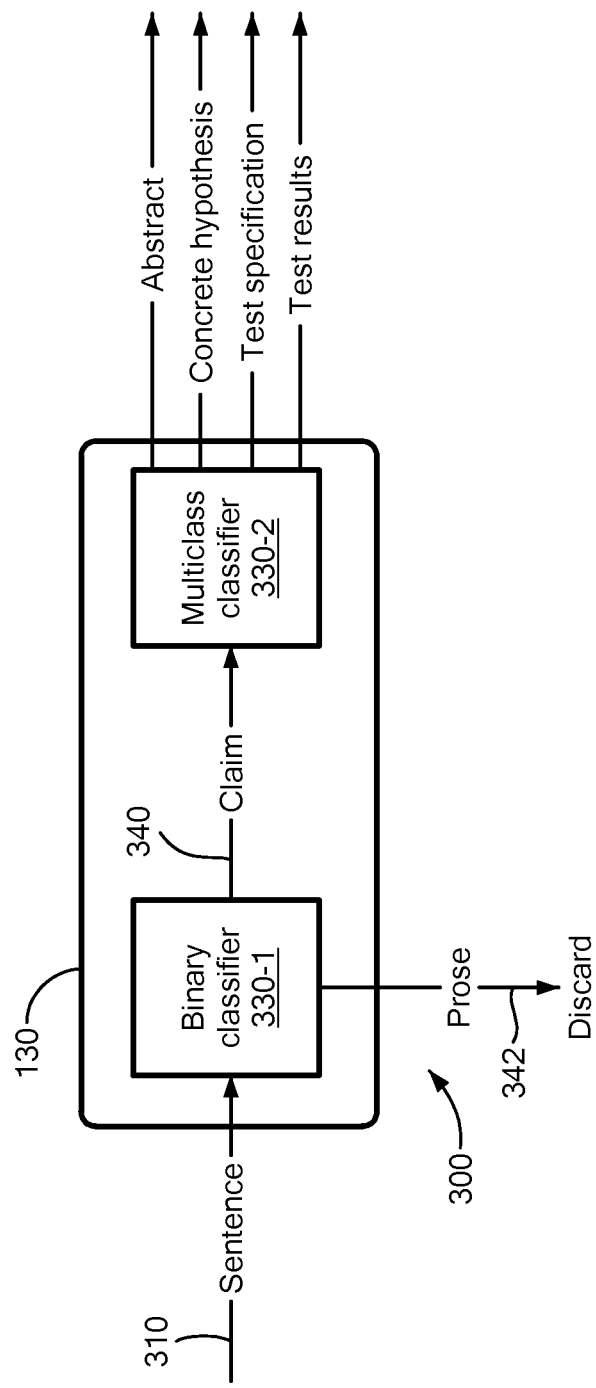
FIG. 3 is an architecture of a model for performing extractive summarization according to the flowchart of FIG. 1.

FIG. 3 is an architecture of a model for performing extractive summarization according to the flowchart of FIG. 1. Referring to FIGS. 1-3, an architecture 300 of the models for multi-stage classification for determining claim assertions of a scientific effort is shown. In the architecture 300, sentences result from intake and parsing of the narrative representation 110. Each sentence 310 results from a sentence or segment of natural language text from a respective document. The multi-stage classifier 130 computes a plurality of groups based on a successive model of a successive set of features trained on a further subset of the corpus of statements. Each group is represented by a model 330-1 . . . 330-2 (330 generally) which define the full multi-stage classifier 130. Additional stages may be employed to further refine classification results.

Each of the models 330 undergoes a training phase prior to a production phase. A corpus of narrative representations is apportioned for training and production phase testing. The basis for training is annotations applied to the corpus to represent the features the model is designed to predict. In the disclosed approach, this includes determining the annotated features based on an assigned value of a scientific assertion promoted by each statement of a plurality of statements included in the corpus.

For the multi-stage model, training involves different annotations of the same corpus. For the example of FIG. 3, a first set of annotated features determines a binary designation among a plurality of sentences in the narrative representation. A second set of annotated features determines a multiclass designation from the sentences in the binary designation.

To produce the annotations of the example configuration, experts manually highlighted amalgamations of portions of sentences from each paper in a fixed corpus of 2400 papers as scientific claims of four possible classification types:
1. abstract, which is a general statement (e.g. hypothesis or conclusion) involving broader concepts and notions;
2. concrete hypothesis, which is a concrete and testable proxy for an abstract claim, or a qualitative interpretation of quantitative results;
3. test specification, which is a description of how experiments were set up or how quantitative results and test were computed;
4. statistical test and inference (results), which consists of quantitative results of experiments or statistical tests, and technical implications thereof.

Each model 330 in the multi-stage classifier 130 is fine-tuned based on the respective features defined by the annotations. In the instant case, this results in two models which are composes in series. This involves training the first (the "claim detector") on labeled scientific claim data with the Boolean objective of predicting whether or not a given sentence is a claim. The second (the "claim classifier") is trained on only the portion of the data that was annotated as a claim, with the objective of predicting the type of the claim. These models 330 are composed in series, with the claim detector model 330-1 passing only the detected claims 340 on to the claim classifier model 330-2 to be labeled with a claim type. Sentences found to be prose 342 do not pass and are not evaluated or used to train the successive phase.

In more detail, for a chosen threshold probability T, given a sentence S, the claim detector 330-1 assigns to it a probability $P_s$ of being a claim. If $P_s>T$, then the sentence is labeled as a claim and passed to the claim classifier 330-2, which assigns to that sentence the probabilities $Q_{s,i}$ of the sentence (now assumed to be a claim) being of claim type $i \in \{0, 1, 2, 3\}$. The sentence is then assigned the final probabilities $1-P_s$ of being prose (i.e. not a claim), and $P_s \cdot Q_{s,i}$ of being a claim of type i. Then this has a natural interpretation in terms of conditional probability: $Q_{s,i}$ is the probability of sentence s being of claim type i, conditioned on it being a claim. Therefore, the overall training from the annotations is such that the first set of annotated features is indicative of statements having a scientific assertion, and the second set of annotated features is indicative of, for the statements indicated as having a scientific assertion, a type of the assertion.

An anomaly of multi-stage training is coordinating the corpus and associated annotations used as the training set between the respective models.

As a matter of practicality, the annotation only identifies one segment of each claim type per paper by design, so that across the 2400 papers we have 9600 annotated claims, which after segmentation yields a total of 20967 claim segments. Training also includes determining, from the classification groups, negative examples of sentences for training features indicative of prose, where the prose not annotated as a scientific assertion and can generally be discarded. To obtain a dataset ready to train a model with, however, both positive and negative examples are needed, whereas the annotations consist only of positive examples i.e. claims. In the example corpus depicted herein, training therefore segments the text of the corpus from which the claims are sourced, producing a total of 831153 segments. The disclosed approach matches the claims to these segments, to produce positive examples from the segments that match a claim and negative examples from those that do not.

However, there are several details that complicate this matching problem. First, a given claim does not necessarily correspond to a contiguous segment of text (much less a single sentence) in the original text, whereas the rule-based segmentation employed splits the text along sentence boundaries. Moreover, due to differences in the extraction/segmentation tooling used, the annotated claims and the segments that were automatically extracted by us each contain distinct kinds of syntactic noise introduced. Lastly, it can be expected that there are claims in a given paper which were not annotated as such, that are nevertheless sufficiently semantically similar to a claim that they should be considered as claims in our data. For these reasons, in many cases the claims have no perfect match to be found in the set of automatically extracted segments, and therefore some measure and threshold of similarity must be used to decide whether an extracted segment should be considered a positive or negative example for training.

A matching operation identifies segments in the annotated corpus defining scientific assertions, and then identifies candidate sentences in the annotated corpus corresponding to the identified segment. A match is performed to identify a probability that each respective candidate sentence corresponds to the identified segment. The solution to the above problem would therefore involve a labeling of each extracted segment of each paper in the given corpus, so that:

If a significant portion of a given segment was included in an annotated claim, then that segment should be labeled as the corresponding type of claim;

The labeling should be robust with respect to syntactic noise occurring as artifacts of the segmentation tooling;

Although only a single claim of each type was annotated as such for each paper, potentially multiple segments which are semantically very similar to a claim of a given type should be labeled as a claim of that type.

These requirements involve both syntactic and semantic notions of similarity between segments of text. In order to produce a matching which accounts for both, several matching functions may be employed, such as Levenshtein distance (i.e. edit distance). These measure different aspects of what it means for two given segments of texts to be similar.

Edit distance is entirely syntactic, counting the minimal number of individual character-level operations required to make the two segments identical. This makes it robust with respect to the previously mentioned syntactic quirks, while less so in comparisons where an extracted sentence is being compared against an annotated claim that includes an exact copy of a portion of the extracted sentence. The example approach uses "normalized edit similarity", which is measured between strings x and y as $$1 - \frac{d(x, y)}{\max(\text{len}(x), \text{len}(y))}$$

where $d(x, y)$ is the edit distance between x and y.

Another matching function is BLUE (Bilingual Evaluation Understudy). BLEU score measures "phrasal" similarity by essentially counting the number of matching n-grams (for varying n) for a given pair of segments. This measure is complementary to edit distance in that it is strong at detecting when two segments have phrases in common but do not completely overlap, in which case edit distance would not detect the similarity of these segments. The counting is precision-centric (counts segment-to-claim matches).

A third matching function/operation is METEOR (Metric for Evaluation of Translation with Explicit Ordering), which essentially counts the number of matching unigrams for a given pair of segments where the unigrams are matched up to stemming and synonymy, thus picks up on semantic similarity between a pair of segments, which neither edit distance nor BLEU score is particularly strong at. The counting is recall-centric (counts claim-to-segment matches), which is another feature that makes METEOR complementary to BLEU.

In more detail, for every (annotated claim, extracted sentence) pair, we measure and record the edit similarity, BLEU score, and METEOR score of the pair. We set separate threshold values for each of the three similarity scores, and whenever a (claim, sentence) pair exceeds any of these thresholds we record it as a potential match. For each sentence, we select the most similar potentially matching claim, and we label the sentence as being of that claim's type. If a sentence has no potentially matching claims, we label it as prose, i.e. not a claim.

Figure 4A:
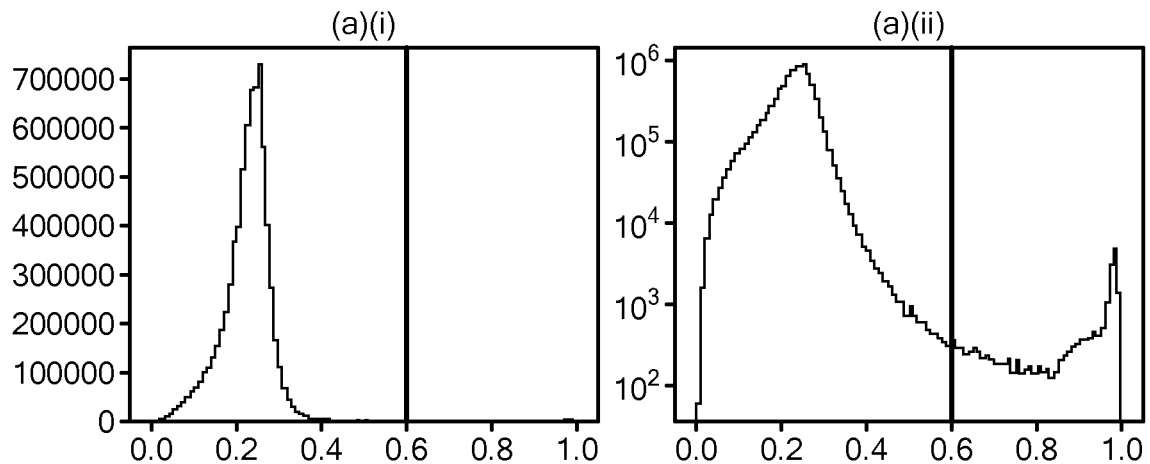
FIGS. 4A-4C show graphs of matching functions for correlating sentences to segments in the narrative representations of FIGS. 1-3.
Figure 4B:
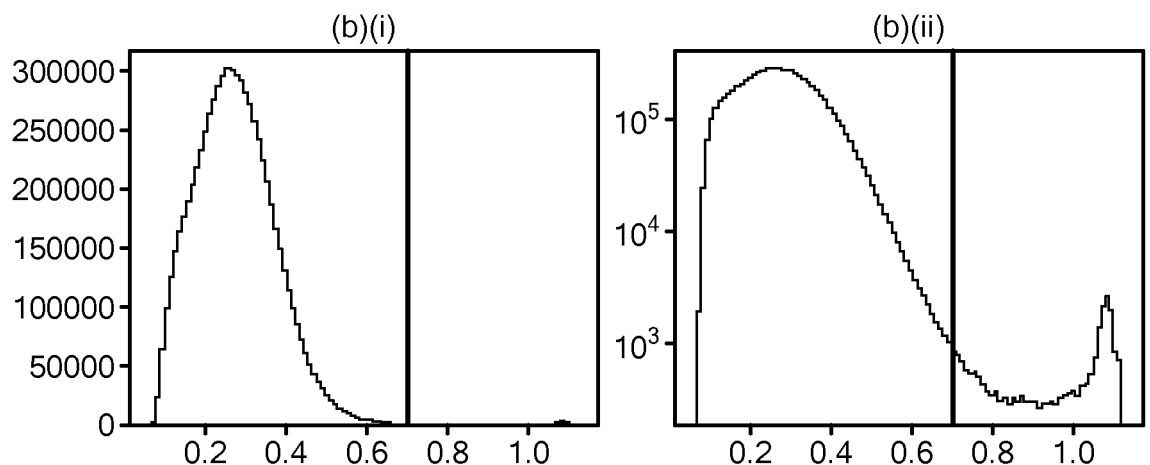
Figure 4C:
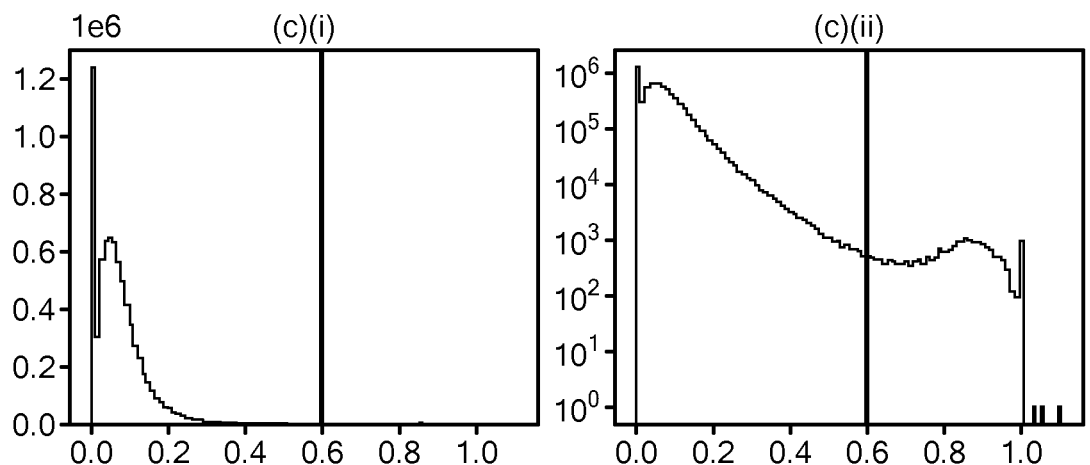

The choices of threshold values are hyperparameters, with no canonical "correct" values. The approach employed was to choose them in as principled a way as possible via the following analysis. First, we found that the similarity scores of the claim-sentence pairs are distributed roughly bimodally. This gives us a range of reasonable choices for the threshold, namely somewhere in the region where a tail of one mode meets a tail of the other, as shown in FIGS. 4A-4C. We then analyzed scatterplots of one similarity score vs. another, where we also found that the claim-sentence pair similarity scores are roughly jointly bimodally distributed, with a lower left mode and an upper right mode. Referring to FIGS. 4A-4C, histograms for varying measures of similarity are shown in FIG. 4A for edit similarity, FIG. 4B for BLEU, and FIG. 4C for METEOR. (i) is the unscaled histogram, while (ii) depicts in log scale for better visibility of the smaller modes. The red lines are drawn at the chosen similarity thresholds. Note: in a few cases the measures exceed 1 due to particular details of implementation.

Figure 5:
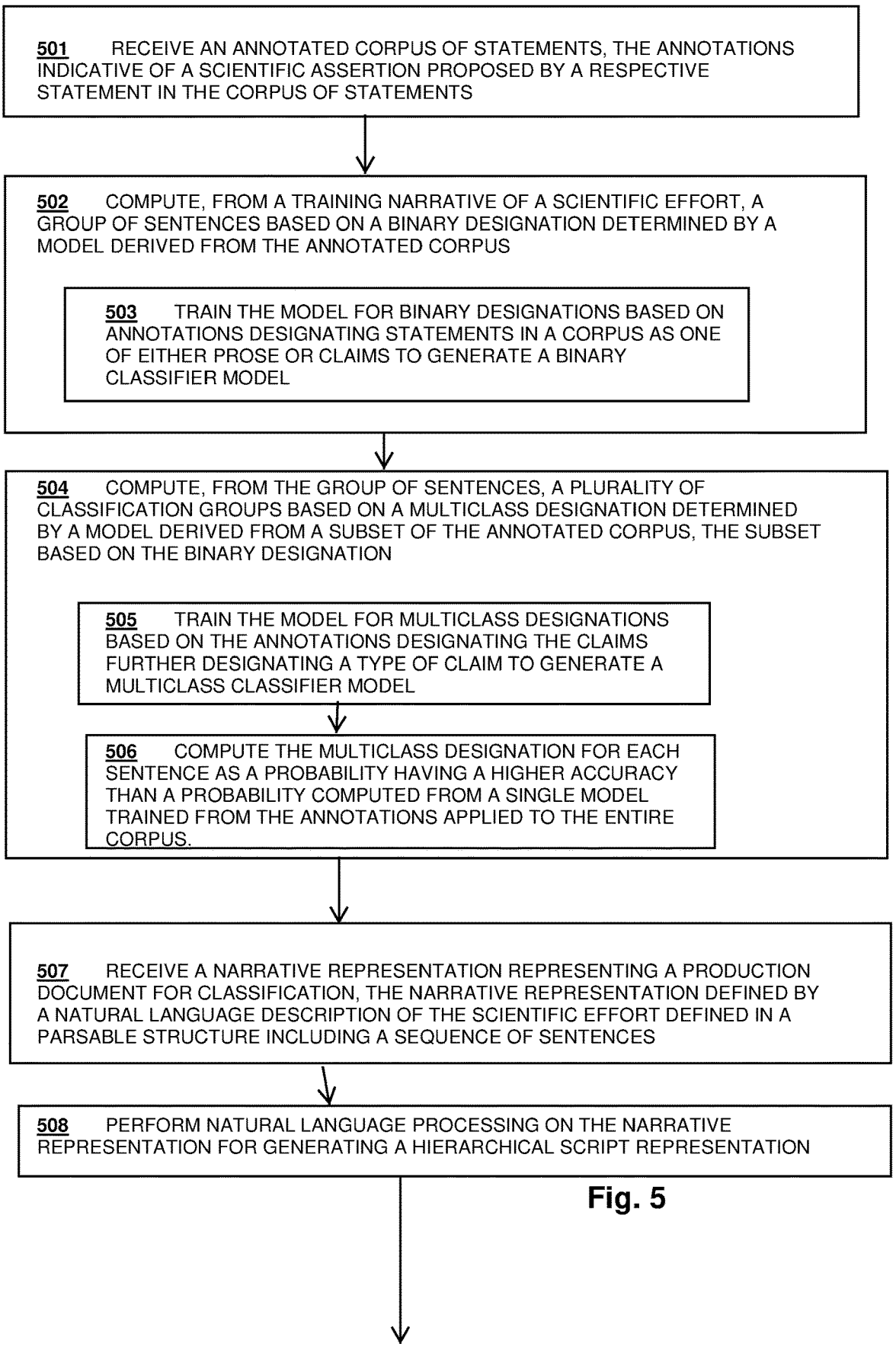
FIG. 5 is a flowchart of training and classification in the model of FIG. 3.
Figure 5:
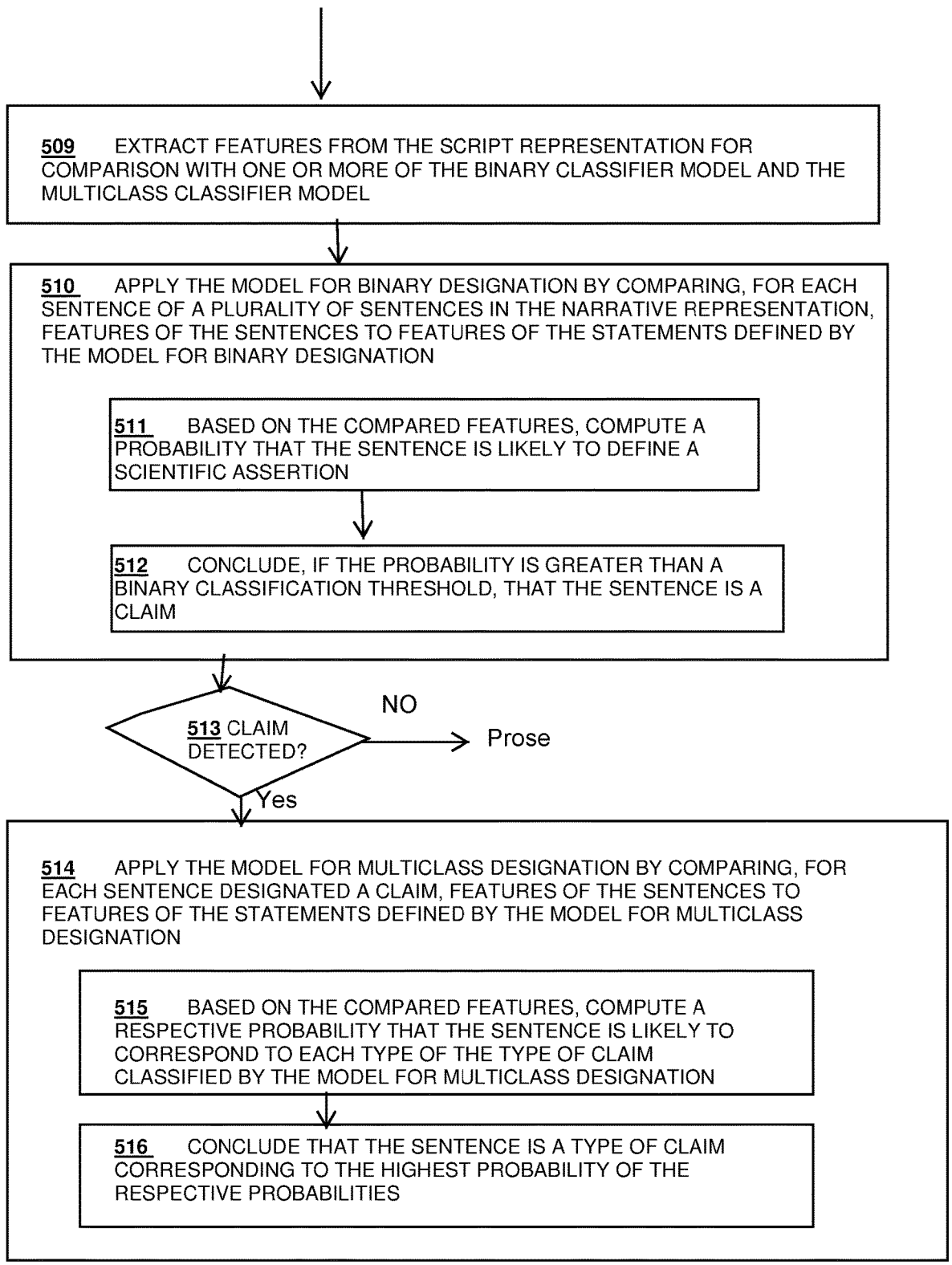
Figure 6:
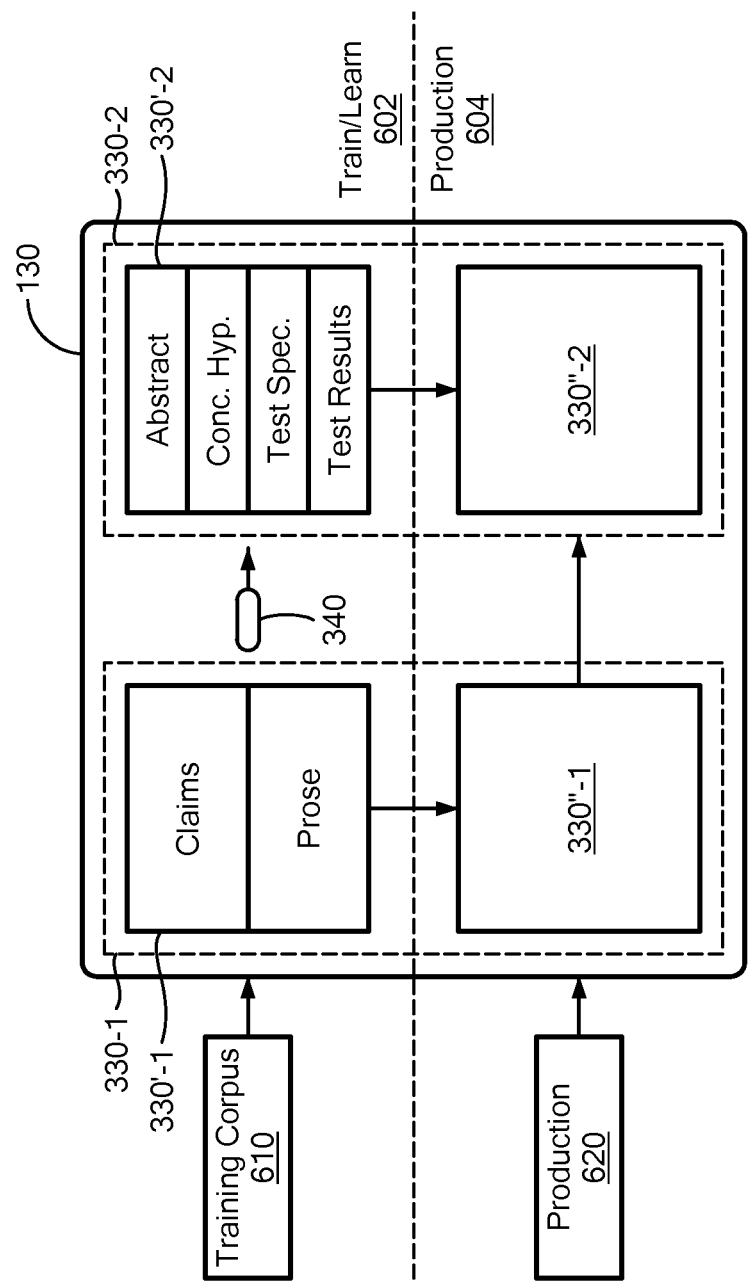
FIG. 6 is a data flow diagram of the training and production phases of the model of FIG. 3.

FIG. 5 is a flowchart of training and classification in the model of FIG. 3, and FIG. 6 is a data flow diagram of the training and production phases of the model of FIG. 3. Referring to FIGS. 1-6, the extractive summarization approach as disclosed herein includes, at step 501, receiving an annotated corpus of statements. The annotations are indicative of a scientific assertion proposed by a respective statement in the corpus of statements. The corpus 610 is taken from the annotated scientific papers for denoting types of scientific assertions: Abstract, Concrete Hypothesis, Test Specification and Test Results. Each statement is a sentence or segment in the respective paper, and a portion (usually majority) is used for a training (or learning) phase 602 and a remaining portion used for testing and validation in a production phase 604.

During the learning phase, the server 132 computes, from a training narrative of a scientific effort, a group of sentences 340 based on a binary designation determined by a model 330'-1 derived from the annotated corpus 610, as depicted at step 502. This includes training the model 330'-1 for binary designations based on the annotations designating statements in a corpus as one of either prose or claims to generate a binary classifier model, as shown at step 503.

For the sentences designated as claims for the binary model 330'-1, the server computes, from the group 340 of sentences, a plurality of classification groups based on a multiclass designation determined by a model 330'-2 derived from a subset of the annotated corpus, where the subset is based on the binary designation, as depicted at step 504. This includes training the model 330'-2 for multiclass designations based on the annotations further designating a type of claim to generate a multiclass classifier model, as depicted at step 505. The multiclass designation for each sentence is computed as a probability of which of the 4 types the claim belongs. This serialized, second classification model has a higher accuracy than a probability computed from a single model trained from the annotations applied to the entire corpus, as shown at step 506. Classification may of course involve any suitable number and granularity of claim types or other feature based classification.

Each model 330-1 and 330-2 undergoes a learning or training phase 602, using the annotated corpus to train the model 330'-1 and 330'-2. Following training, the trained models 330"-1 and 330"-2 evolve to a production phase 604 for binary and multiclass classification. The model 130 receives a narrative representation representing a production document 620 for classification, such that the narrative representation is defined by a natural language description of the scientific effort defined in a parsable structure including a sequence of sentences, as depicted at step 507. The production phase 604 performs natural language processing on the narrative representation for generating a hierarchical script representation (similar parsing/recognition as the training phase), as depicted at step 508. The server 132 extracts features from the script representation for comparison with one or more of the binary classifier model 330"-1 and the multiclass classifier model 330"-2, as disclosed at step 509.

The production phase applies the model 330"-1 for binary designation by comparing, for each sentence of a plurality of sentences in the narrative representation, features of the sentences to features of the statements defined by the model for binary designation, as depicted at step 510. Based on the compared features, the binary model 330"-1 computes a probability that the sentence is likely to define a scientific assertion, as depicted at step 511, and concludes, if the probability is greater than a binary classification threshold, that the sentence is a claim, as shown at step 512. The threshold is a settable and tunable parameter. A check is performed, at step 513, to determine if a claim is detected. If so, then the production phase 604 applies the model 330"-2 for multiclass designation by comparing, for each sentence designated a claim, features of the sentences to features of the statements defined by the model for multiclass designation. The production phase 604 therefore applies the trained model for type classification following the binary classification. Based on the compared features, the multiclass model 330"-2 computes a respective probability that the sentence is likely to correspond to each type of the type of claim classified by the model 330"-2 for multiclass designation, as depicted at step 515. It then concludes that the sentence is a type of claim corresponding to the highest probability of the respective probabilities, as disclosed at step 516. A probability is computed for each of the 4 types, and the type of the sentence is determined based on the greatest of the 4 probability values.

The example model architecture 300 shows a first binary (two types) stage followed by a second 4 class determination. Additional stages of classification could be applied in alternate configurations, as well as additional classification types at each stage.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for multi-stage classification for determining claim assertions of a scientific effort, comprising:
    training a first model from an annotated corpus of statements derived from stored documents:
        computing, from a narrative representation of a scientific effort, a first group of sentences, based on a comparison of the first model of a first set of annotated features derived from the annotated corpus of statements;
        training a second model from the annotated corpus of statements; and
        computing, from the first group of sentences, a classification of each of the sentences in the first group of sentences based on comparing the second model of a second set of annotated features derived from the annotated corpus of statements, the second model trained on a subset of the annotated corpus, the subset determined based on the first set of annotated features,
        the classification of each sentence defined by a probability having a higher accuracy than a classification based only on a single model derived from both the first set and the second set of annotated features.
2. The method of claim 1 further comprising computing a plurality of groups based on a successive model of a successive set of features trained on a further subset of the corpus of statements.
3. The method of claim 1 wherein:
    the first set of annotated features determines a binary designation among a plurality of sentences in the narrative representation; and
    the second set of annotated features determines a multiclass designation from the sentences in the binary designation.
4. The method of claim 1 further comprising:
    determining the annotated features based on an assigned value of a scientific assertion promoted by each statement of a plurality of statements included in the corpus.
5. The method of claim 1 wherein the first set of annotated features is indicative of statements having a scientific assertion, and the second set of annotated features is indicative of, for the statements indicated as having a scientific assertion, a type of the assertion.
6. A method for multi-stage classification for determining claim assertions of a scientific effort, comprising:
    receiving an annotated corpus of statements, the annotations indicative of a scientific assertion proposed by a respective statement in the corpus of statements;
    training a model from an annotated corpus of statements derived from stored documents;
    computing, from a training narrative of a scientific effort, a group of sentences based on a binary designation determined by the model derived from the annotated corpus; and
    computing, from the group of sentences, a plurality of classification groups based on a multiclass designation determined by a model trained from a subset of the annotated corpus, the subset based on the binary designation,
    the multiclass designation for each sentence computed as a probability having a higher accuracy than a probability computed from a single model trained from the annotations applied to the entire corpus of statements.
7. The method of claim 6 further comprising:
    training the model for binary designations based on annotations designating statements in a corpus as one of either prose or claims to generate a binary classifier model; and
    training the model for multiclass designations based on the annotations designating the claims further designating a type of claim to generate a multiclass classifier model.
8. The method of claim 7 further comprising:
    receiving a narrative representation representing a production document for classification, the narrative representation defined by a natural language description of the scientific effort defined in a parsable structure including a sequence of sentences; and
    performing natural language processing on the narrative representation for generating a hierarchical script representation; and
    extracting features from the script representation for comparison with one or more of the binary classifier model and the multiclass classifier model.
9. The method of claim 8 further comprising:
    applying the model for binary designation by comparing, for each sentence of a plurality of sentences in the narrative representation, features of the sentences to features of the statements defined by the model for binary designation;
    based on the compared features, computing a probability that the sentence is likely to define a scientific assertion; and
    concluding, if the probability is greater than a binary classification threshold, that the sentence is a claim.
10. The method of claim 8 further comprising:
    applying the model for multiclass designation by comparing, for each sentence designated a claim, features of the sentences to features of the statements defined by the model for multiclass designation;
    based on the compared features, computing a respective probability that the sentence is likely to correspond to each type of the type of claim classified by the model for multiclass designation; and
    concluding that the sentence is a type of claim corresponding to the highest probability of the respective probabilities.

11. The method of claim wherein 10 associating sentences from the narrative representation based on a correspondence of natural language features with the statements designated as claims.

12. The method of claim 6 further comprising:
determining, from the classification groups, negative examples of sentences for training features indicative of prose, the prose not annotated as a scientific assertion; and
training the respective model on the negative examples.

13. The method of claim 12 further comprising:
identifying segments in the annotated corpus defining scientific assertions;
identifying candidate sentences in the annotated corpus corresponding to the identified segment; and
performing a match to identify a probability that each respective candidate sentence corresponds to the identified segment.

14. A server device having a multi-stage classifier for determining claim assertions of a scientific effort, comprising:
a first stage model responsive to a training narrative of a scientific effort for computing, a group of sentences based on a binary designation, the first model trained from an annotated corpus of statements derived from stored documents;
a second stage model trained from a subset of the annotated corpus of statements, the second stage model responsive to the group of sentences for computing a plurality of classification groups based on a multiclass designation determined from the subset of the group of sentences, the subset based on the binary designation;
the server device configured for executing the first stage model and the second stage model in series; and
a rendering device for receiving the sentences based on the multiclass designation, the multiclass designation for each sentence computed as a probability having a higher accuracy than a probability computed from a single model trained from a single model defining the multiclass designation.

15. The server device of claim 14, further comprising:
a training corpus based on annotations of a plurality of documents defining a scientific effort,
the server configured for training the first model for binary designations based on annotations designating statements in a corpus as one of either prose or claims to generate a binary classifier model; and
the server configured for training the second model for multiclass designations based on the annotations designating the claims further designating a type of claim to generate a multiclass classifier model.

16. A computer program embodying program code on a non-transitory medium that, when executed by a processor, performs steps for implementing a method for or multi-stage classification for determining claim assertions of a scientific effort, the method comprising:
training a first model from an annotated corpus of statements derived from stored documents;
computing, from a narrative representation of a scientific effort, a first group of sentences, based on a comparison of the first model of a first set of annotated features derived from the annotated corpus of statements;
training a second model from the annotated corpus of statements; and
computing, from the first group of sentences, a classification of each of the sentences in the first group of sentences based on comparing the second model of a second set of annotated features derived from the annotated corpus of statements, the second model trained on a subset of the annotated corpus, the subset determined based on the first set of annotated features,
the classification of each sentence defined by a probability having a higher accuracy than a classification based only on a single model derived from both the first set and the second set of annotated features.

17. A method for multi-stage classification for determining claim assertions of a scientific effort, comprising:
receiving an annotated corpus of statements, the annotations indicative of a scientific assertion proposed by a respective statement in the corpus of statements;
computing, from a training narrative of a scientific effort, a group of sentences based on a binary designation determined by a model derived from the annotated corpus;
training the model for binary designations based on annotations designating statements in a corpus as one of either prose or claims to generate a binary classifier model;
training the model for multiclass designations based on the annotations designating the claims further designating a type of claim to generate a multiclass classifier model; and
computing, from the group of sentences, a plurality of classification groups based on a multiclass designation determined by a model trained from a subset of the annotated corpus, the subset based on the binary designation,
the multiclass designation for each sentence computed as a probability having a higher accuracy than a probability computed from a single model trained from the annotations applied to the entire corpus of statements.

* * * * *